Figure 1:
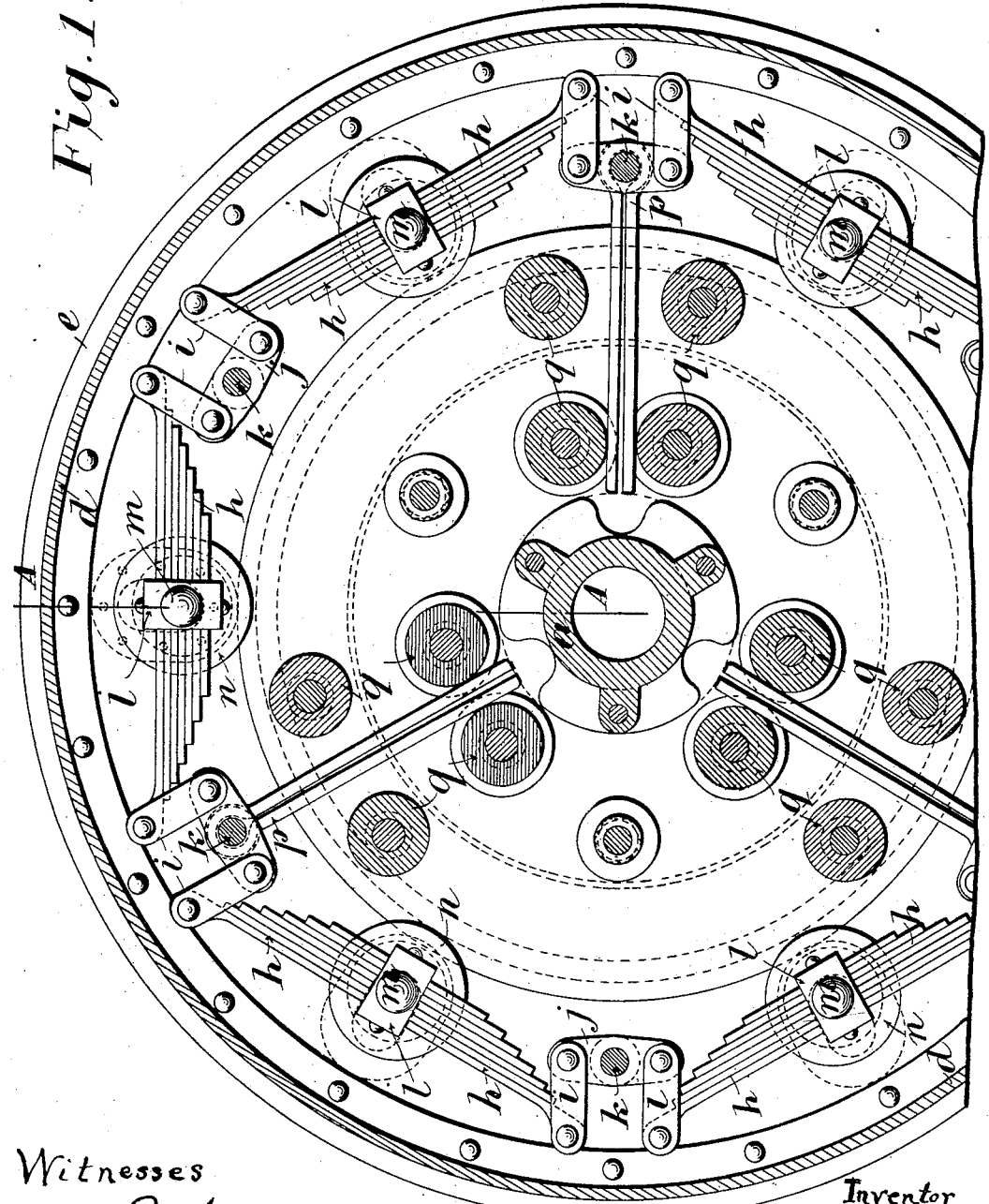

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 1.

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 2.

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 4.

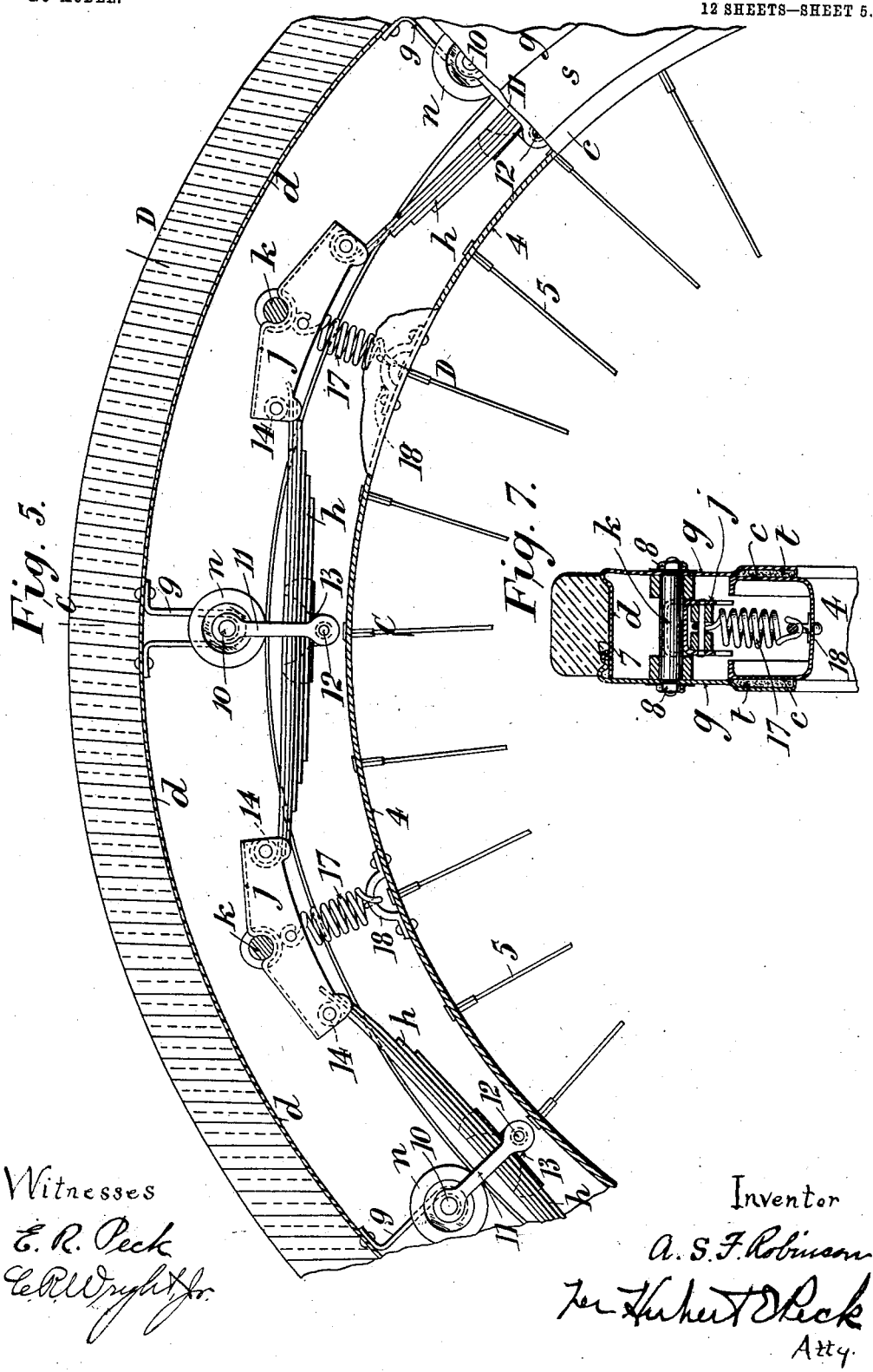

No. 762,196. PATENTED JUNE 7, 1904.
A. S. F. ROBINSON.
WHEEL FOR VEHICLES.
APPLICATION FILED FEB. 7, 1903.
NO MODEL.
12 SHEETS—SHEET 6.
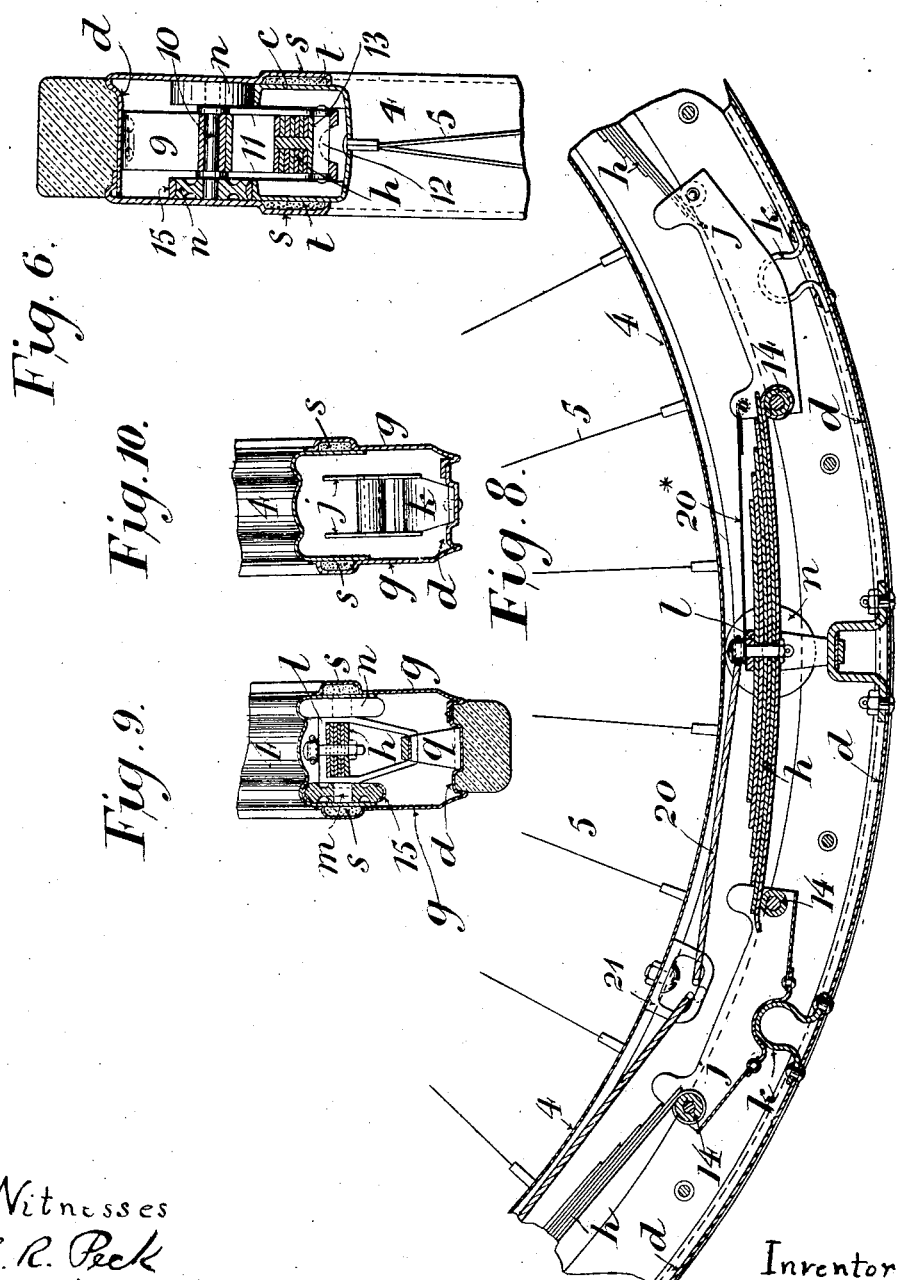
Witnesses
E. R. Peck
E. A. Wright Jr.
Inventor
A. S. F. Robinson
Per Hubert D. Peck
Atty.

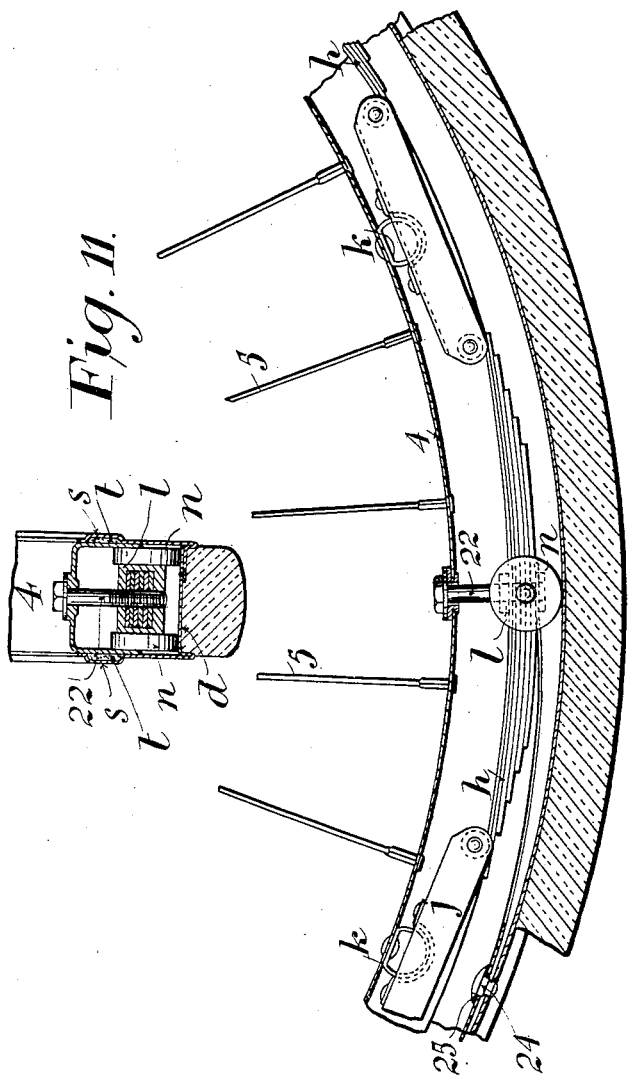

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 9.

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 11.

Witnesses
E. R. Peck
C. P. Wright Jr.

Inventor
A. S. F. Robinson
per Hubert Peck
Atty.

No. 762,196. PATENTED JUNE 7, 1904.
A. S. F. ROBINSON.
WHEEL FOR VEHICLES.
APPLICATION FILED FEB. 7, 1903.
NO MODEL. 12 SHEETS—SHEET 12.
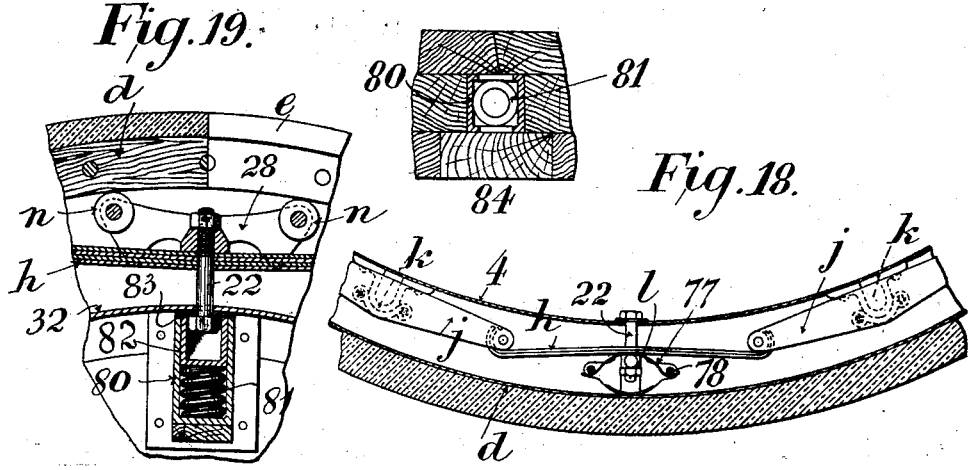
Witnesses
E. R. Peck
E. A. Wright Jr.
Inventor
A. S. F. Robinson
per Hubert E. Peck
Atty.

No. 762,196. Patented June 7, 1904.

UNITED STATES PATENT OFFICE.

ARTHUR SAMUEL FRANCIS ROBINSON, OF BECCLES, ENGLAND.

WHEEL FOR VEHICLES.

SPECIFICATION forming part of Letters Patent No. 762,196, dated June 7, 1904.

Application filed February 7, 1903. Serial No. 142,407. (No model.)

*To all whom it may concern:*

Be it known that I, ARTHUR SAMUEL FRANCIS ROBINSON, a subject of the King of Great Britain and Ireland, residing at Beccles, in the county of Suffolk, England, have invented Improvements in Wheels for Vehicles, of which the following is a specification.

This invention has reference to improvements in vehicle-wheels of the kind wherein the rim portions are connected to the hubs by or through springs which tend to maintain the rim portions concentric to the hubs and allow of relative movements of the said parts in any direction in opposition to the springs when shocks are imparted to the rim portions, owing to unevenness of the road-surface, and thus tend to prevent the transmission of shocks to the vehicle-body.

According to this invention the rim portion of a wheel is normally maintained concentric to its hub portion by means of a number of lever-springs which are arranged in an approximately tangential manner and whose ends act upon compensating levers, the compensating levers and the lever-springs being adapted to thrust in radial directions the one against the rim portion and the other against the hub portion, relative rotary movement of the rim and hub portions being provided for. The arrangement, moreover, is such that resistance is offered by the several springs to relative displacement of the centers of the rim and hub portions and is distributed among the several lever-springs.

A further improvement consists in arranging each of the springs which tend to maintain the concentricity of the rim and hub portions of the wheel so that the spring which is connected to one of said portions is capable of moving toward or away from the other portion, according to the position it occupies for the time being in relation to the forces acting upon the wheel.

Wheels according to this invention are especially applicable to motor-cars, traction-engines, and the like.

Figure 2:
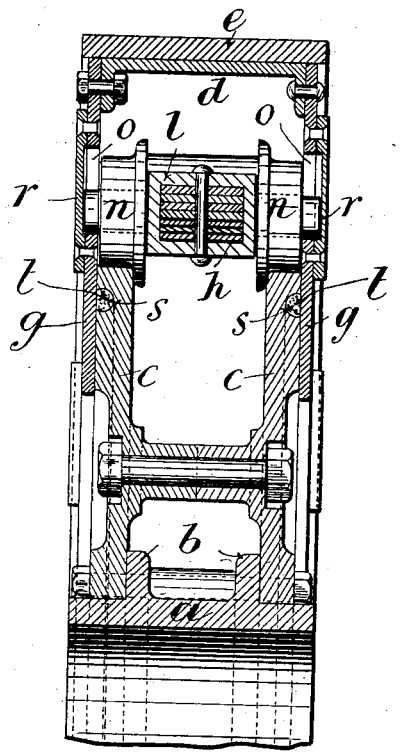
Figure 3:
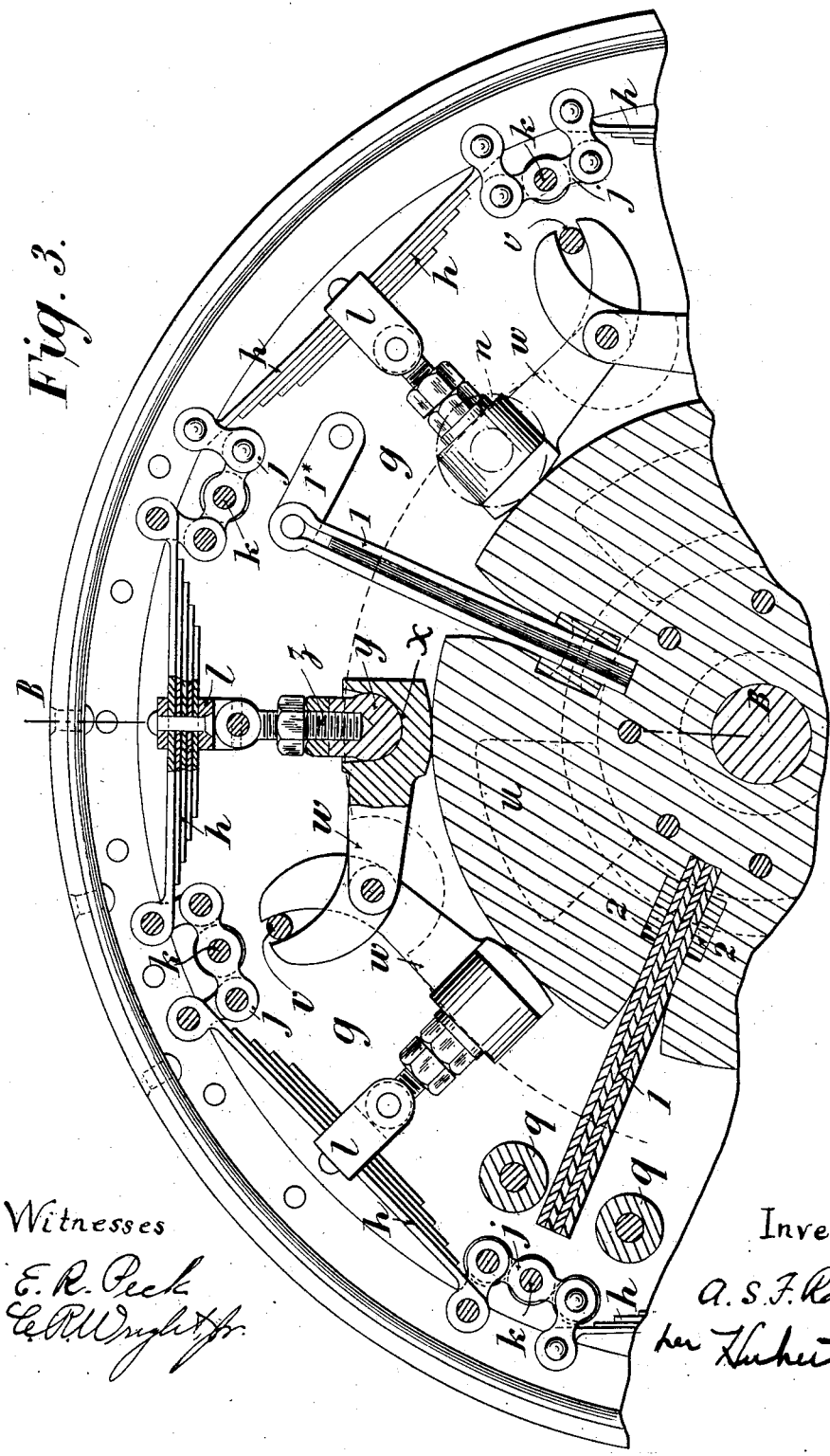
Figure 4:
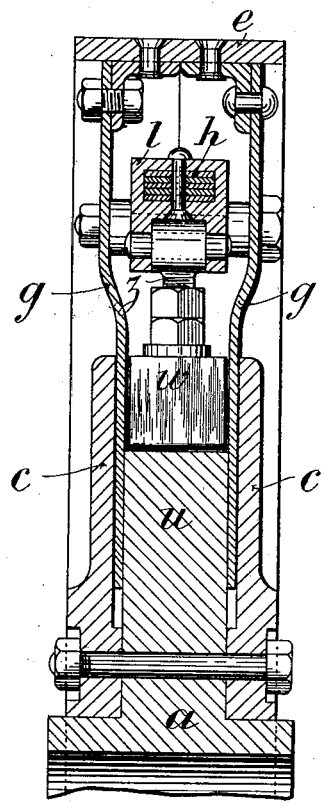

In the accompanying drawings, Figure 1 is a sectional side view of one construction of spring-wheel according to this invention. Fig. 2 is a part section on the line A A, Fig. 1. Fig. 3 is a similar view to Fig. 1 of part of a modified construction of wheel, a portion of the wheel-casing being removed for the sake of clearness. Fig. 4 is a part section on the line B B, Fig. 3. Fig. 5 is a similar view to Fig. 3 of a modification; and Figs. 6 and 7 are part sections on the lines C C and D D, Fig. 5. Figs. 8, 9, and 10 are similar views to Figs. 5, 6, and 7. Figs. 11 and 12 are sectional views illustrating a further modification; and Figs. 13 and 14 and 15 and 16 are similar views to Figs. 1 and 2, illustrating other modified constructions. Figs. 17 to 20 are detail views hereinafter referred to.

Referring to Figs. 1 and 2, the hub $a$ of the wheel is formed with flanges $b$, on the outer sides of each of which an annular plate $c$ is bolted, and the rim comprises a ring $d$, of channel-iron, which may be shod with a tire $e$. To the outer side of each of its inwardly-projecting flanges is secured an annular plate $g$, which overlaps and makes a joint with the corresponding side plate $c$. One of the plates $g$ may be detachably secured by bolts and the other riveted, as shown. Within the channel $d$ are arranged in an approximately tangential manner, as shown, a number of laminated lever-springs $h$, having their ends connected together by links $i$ and compensating levers $j$, fulcrumed on pins or bolts $k$, held in the side plates $g$. Each spring $h$ has its plates held together by a central strap $l$, formed with laterally-projecting gudgeons $m$, on which are journaled flanged rollers $n$ and which project beyond their rollers into and slightly through radial slots $o$ in the side plates $g$ and rest against the inner ends of the slots $o$, as shown, which admit of their outward but prevent further inward movement. The rollers rest on the peripheries of the annular side plates $c$ with their flanges against the insides of the said plates when the rim portion is in the normal and concentric condition. When the axle of the wheel becomes eccentric with the rim portion of the wheel through extra load or bad roads, the side plates $c$ force outwardly the straps $l$ of the lower springs, and the rollers $n$ of the upper springs, which remain with their gudgeon ends resting in the inner parts of the slots $o$, are carried by the movement of the rim portion somewhat away from the peripheries of the plates $c$. The elasticity of the top springs, owing to their being fulcrumed in the slots and connected by the links $i$ and compensating levers $j$ to the other springs, assists that of the other springs in cushioning relative movements of the rim and hub portions of the wheel, so that although no single spring has great range of elasticity by connecting a number of these springs together sufficient elasticity is obtained, and the resistance offered by the several springs is so distributed that a cushioning effect is obtained similar to that obtained with a pneumatic tire. With the arrangement described, notwithstanding that the springs mutually assist each other, they are subjected to inwardly-directed forces at their ends and outwardly-directed forces at their middle portions irrespective of whether they happen to be at the top or the bottom of the wheel. The rim portion may be driven with the hub in any convenient manner. In the example, to some—for instance, three—of the pins or bolts $k$ rods $p$ may be attached, which rods pass between sets of rollers $q$, carried by pins fixed to the side plates $c$. Each set of rollers $q$ may comprise two pairs—an inner pair arranged close together and an outer pair arranged somewhat farther apart, as shown. In driving, the hub-plates $c$ rotate within the rollers $n$ until each of the driving-rods $p$ abut against one or other of its outer pair of rollers $q$, when the lever will become sufficiently locked and will transmit the rotation of the hub to the rim. The rods $p$ may resemble large spring split pins, the eyes of which are threaded on the fulcrum-pins $k$, or they may be otherwise formed so that spring resistance is offered by such levers to the turning movement of the hub and shock thereby reduced. The slots $o$ are closed by cover-plates $r$, and the working parts of the wheel can then be lubricated by oil charged into the chamber formed by the hub and rim portions of the wheel. In some cases an annular recess $s$ may be formed in the side plates $c$, as shown, or $g$, and suitable packing $t$ be placed therein.

In the modified arrangement illustrated by Figs. 2, 3, and 4 the hub is formed with a central flange $u$, and the annular side plates $g$ of the rim portion fit and work in the space between it and the annular side plates $c$ of the hub, and inward movement of the straps of the springs $h$ is not limited by slots, but by means of stops $v$, carried by the rim side plates $g$ and limiting the movement of levers $w$, fulcrumed to the plates $g$ and serving as thrust-plates between the hub-flange $u$ and the spring-straps $l$. Each lever $w$ is formed with a recess $x$, which receives a ball-joint $y$, into which is screwed a bolt $z$, that is hinged to the corresponding spring-strap $l$. Conveniently the levers $w$ are hinged together in pairs, as shown, the hinge-pins being fixed to the side plates $g$. The levers are extended beyond the hinge and are turned outwardly, as shown, so as to embrace a stop $v$. The levers $w$ may be provided with rollers $n$, resting on the periphery of the hub-flange $u$, as indicated in dotted lines. The driving may be effected by means of laminated spring-arms 1, riveted between washer-plates 2, secured in slots in the hub. The arms 1 extend radially between rollers $q$, carried by the side plates $g$, as shown in the left-hand portion of Fig. 3, or they may be connected to the said plates by jointed drag-links 1*, as shown in the right-hand portion of the figure.

In the arrangements shown in Figs. 5, 6, and 7 the rim portion is in the form of a channel-ring $d$, of thin metal, into which extend the flanges $c$ of a trough-shaped ring 4, to which spokes 5 connect the hub proper, 6. For the sake of lightness the rings $d$ and 4 may be of metal, such as aluminium, or of wooden rings with annular side plates secured thereto. The ring $d$ has one side which is removable and is or may be flanged to fit over the rim part of the ring like a lid and is held in place there by screws 7. The pins $k$ are shouldered, so as to act as distance-studs between the sides of the ring $d$, and their ends are provided with nuts 8, which rigidly hold the sides. To the ring $d$ are fixed U-shaped radially-arranged hangers 9, as shown, in each of which rests a pin 10, Fig. 6, carrying on either side a roller $n$ and a link 11. The links pass on either side of a laminated lever-spring $h$ and have their other ends fitting a pin 12, on which is mounted a block 13, supporting the spring $h$. The spring bears against loose sleeves 14, carried by cross-pins on the compensating levers $j$, which are of channel-section. The rollers $n$ and their pins 10 may be fitted with tires or sleeves 15, of india-rubber or the like. The flanges of the inner ring are turned inward, and when the wheel is concentric the rollers $n$, whose pins 10 then lie in the bottoms of the hangers 9, bear upon the said flanges, and as the rim portion becomes eccentric the rollers are successively forced outwardly, and the hangers 9 compel them to move in radial lines and prevent tangential influence acting on the springs and their connections. To drive the rim portion, spiral springs 17 connect eyes 18 on the ring 4 to pins passing through the compensating-lever sides.

In the arrangement illustrated in Figs. 8, 9, and 10 a further reduction in the weight and space occupied by the spring arrangement is effected by the rollers $n$ being directly connected to trunnions $m$ on the spring-straps $l$ and being arranged to bear upon the bottom or inner wall of the ring 4. The outer portions of the spring-straps $l$ are of loop-like formation and rest in hangers $q$, which may be rubber or leather lined, as shown. The compensating-lever fulcrums $k$ may be castings or light metal parts riveted to the ring $d$, as shown. Instead of the springs 17 (shown in Fig. 5) the driving of the rim portion from the hub portion of the wheel may be effected by flexible connections 20, extending from hooks or eyes 21, secured to the ring 4, for instance, near the fulcrum of each compensating lever $j$ to the straps $l$ of the adjacent lever-springs $h$, which are stayed to the next lever $j$ by blades 20*.

In another arrangement (illustrated by Figs. 11 and 12) the compensating-lever fulcrums $k$ are on the inner ring 4 or hub portion instead of on the outer ring $d$ or rim portion, thereby enabling still less space to be taken up, a lighter wheel to be made, and such as will come within the compass of the ordinary bicycle-wheel. Screws 22 are passed through holes in the ring 4, through the springs $h$, and into the spring-straps $l$. The screw-heads limit the outward movement of the middle portions of the springs instead of their inward movements, as in the arrangements already described, and when the rim portion becomes eccentric to the hub portion, due to load, the screw-heads rise at the lower part of the wheel, but remain seated against the ring 4 at the upper part, and the upper rollers $n$ leave the ring $d$. A steel or other flexible band 23, extending from one spring to the next, connects the straps $l$ of such springs and a stud 24, projecting from the ring $d$ through an eyelet-strengthened hole or slot 25 in the band. Felt or tow rings $t$, saturated with lubricant and contained in annular grooves or recesses $s$, prevent serious metallic contact between the rings $d$ and 4 and prevent dust from getting into the spring part of the wheel, which is charged with lubricant.

Figure 13:
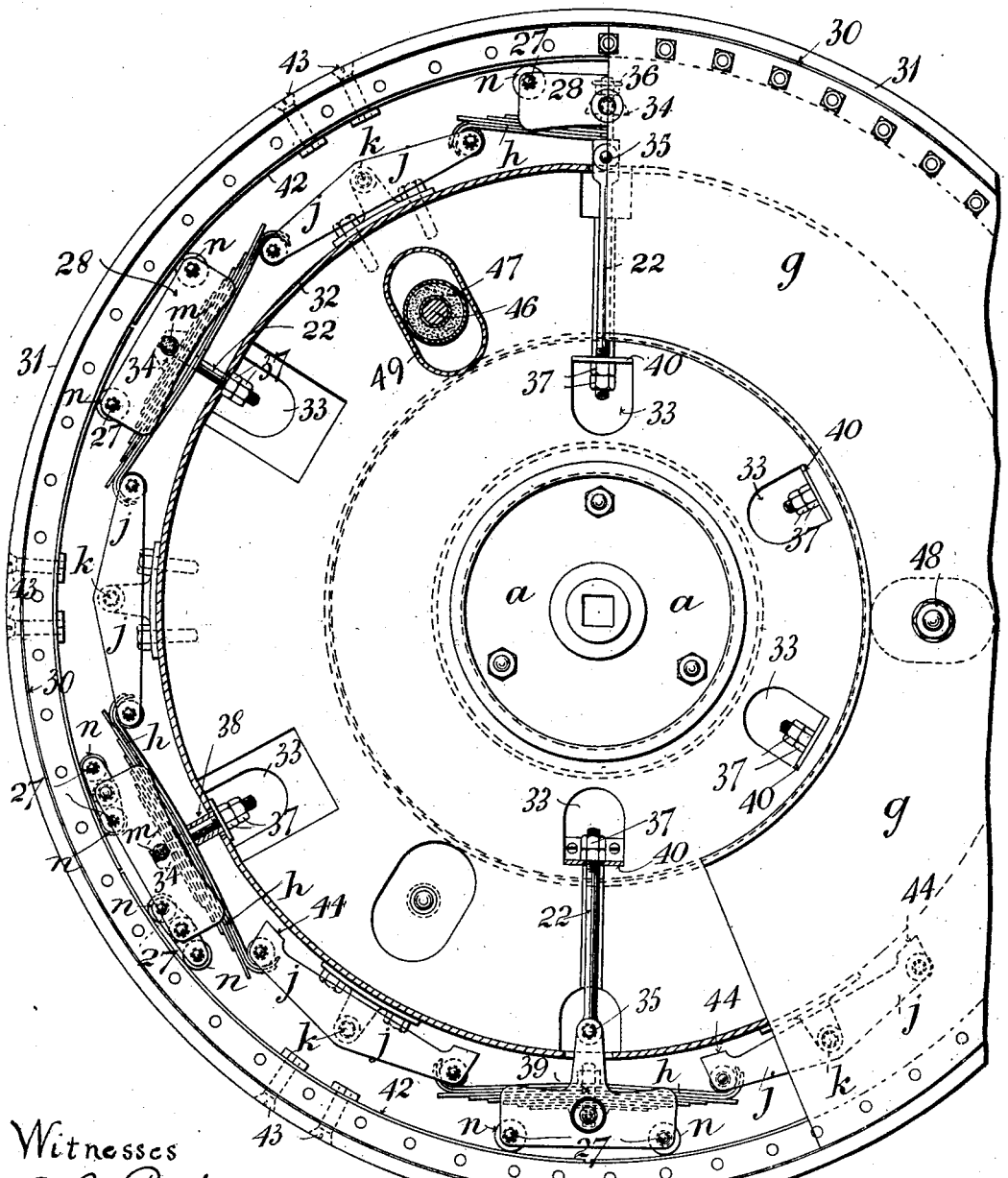
Figure 14:
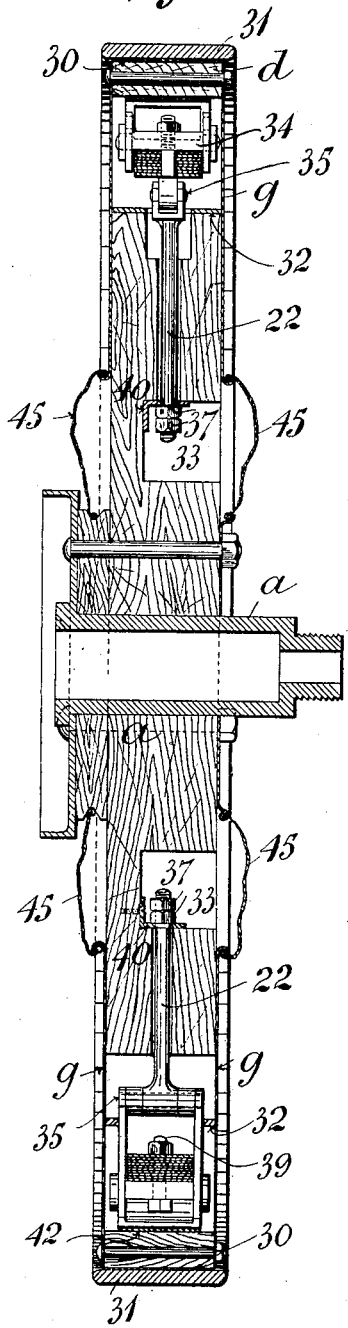

To enable the number of rollers $n$ to be increased, so as to further distribute the thrust without interfering with the spring action, instead of attaching the rollers direct to the gudgeons $m$ of each spring-strap $l$ rollers $n$ are mounted, as illustrated in Figs. 13 and 14, on pins 27, carried by levers 28, at equal distances from their fulcrums, which are attached to the springs $h$, the levers 28 thus forming small carriages which receive the thrust of the springs through their fulcrums. The pins 27 are shouldered and riveted to the levers 28 to keep them at the proper distance apart. The rollers of this carriage can be made almost as wide as the wheel. In place of single rollers $n$ each end of the levers 27 may have pivoted to it another lever having roller ends and forming a sort of bogie attachment, thus enabling four instead of two rollers to be used on each spring, thus still further distributing the thrust. Such an arrangement is shown applied to one spring $h$ at the lower left-hand part of Fig. 13. If in any particular case this does not sufficiently distribute the thrust, the ends of the bogie-levers may be fitted with further levers and rollers, thus bringing eight rollers into play instead of four, and so on. Such arrangements of rollers may be employed when the rollers $n$ bear against the hub portion of the wheel.

The wheel illustrated in Figs. 13 and 14 is suitable for motor-cars and the like. The ring $d$ is of wood fitted with an outer light iron binding-ring 30 and a solid metal tire 31 or a rubber tire. The annular side plates $g$ are securely bolted to the ring $d$ and overlap and closely fit against the sides of the hub portion, which is built up of wood segments bonded with a shrunk-on metal ring 32. The hub portion may be formed of an aluminium or other suitable casting, if desired. The fulcrums $k$ of the levers $j$ are fixed to the ring 32, and the retaining-screws 22 extend into recesses 33 left in the wood through holes in the ring 32. The bolts 22 are attached to the springs by being screwed through them into blocks 34, which are formed with the gudgeons $m$, which form the fulcrums of the carriages 28. The bolts 22 may be connected to the blocks 34 in various ways. That of the spring at the top of Fig. 13 is shown long and is jointed at 35, the spring and block 34 being clamped against a shoulder on the bolt by a nut 36. 37 are adjusting-nuts. The next bolt 22 is shown as short and without a shoulder and is simply screwed into the block 34. The next one is provided with a distance-sleeve 38, against which the spring is clamped by tightening the adjusting-nuts 37. The bolt 22 (shown at the bottom of Fig. 13) is long and is jointed to inwardly-extending ears on the levers 28, (hereinafter referred to collectively as "carriages,") the spring $h$ being clamped to the block 34 by a supplementary bolt 39, so that the spring can oscillate relatively to its carriage 28 and independently of its bolt 22. By the use of long bolts 22, which extend through abutments 40, that are located near the wheel center, as shown at the top and bottom of Fig. 13, the angular movement imparted to the bolts by the movement of such abutments relatively to the rim portions of the wheel will be very slight and will not be transmitted to the carriages 28 by the bolts 22 if the latter be hinged or jointed to the carriages. As will be seen, the abutments are near the centers of the wheels in such positions as not to be covered by the side plates $g$, so that the adjusting-nuts 37 can be manipulated without it being necessary to dismantle the wheel. In order that the rollers $n$ may not rattle when in the upper portion of the wheel, a spring-path is provided for the rollers to rest upon. It may comprise a number of spring-blades 42, bent to a curve of different radius to the portion of the wheel on which they bed themselves when pressed by the rollers $n$ and fixed thereto at their middle parts by bolts or rivets 43, so that their end portions will normally stand away from the said portion of the wheel. The spring-path may be bedded upon a strip of webbing or other suitable material.

Instead of being curved the spring-blades 42 may be normally straight, so that portions of them intermediate between their centers and ends will stand away from the ring $d$. In some cases the spring-blades may be sufficiently powerful to assist the lever-springs in overcoming the transmission of shocks. To limit the movements of the levers $j$, they may in some cases be formed with projections 44, as shown in the lower part of Fig. 13. The inner part of the ring $d$ may be metal-lined to form a path for the rollers $n$ to run upon. Instead of or in addition to felt dust-excluding rings $t$, as previously described, the side plates $g$ have clamped or sprung onto them the outer elastic edge of a ring 45 of flexible material, such as canvas, the inner elastic edge of which is clamped or sprung onto the hub portion. The rim portion is driven from the hub portion by shouldered distance-pins 46, fitted with bushed rubber rollers 47 and secured between the side plates $g$ by nuts 48, which pins 46 extend freely through radial slots 49 in the hub portion. The pins are of less diameter than the width of the slots, so as to permit relative motion of the hub and rim portions even parallel to any one of the slots, the one portion then slewing relatively to the other portion about one of the other pins. When one side or the other of the slots 49 comes against the rollers 47, motion is imparted to the rim portion; but the action of the springs in the wheel is not interfered with, and shock to the driving-gear is avoided by the resilience of the rubber rollers.

Figure 15:
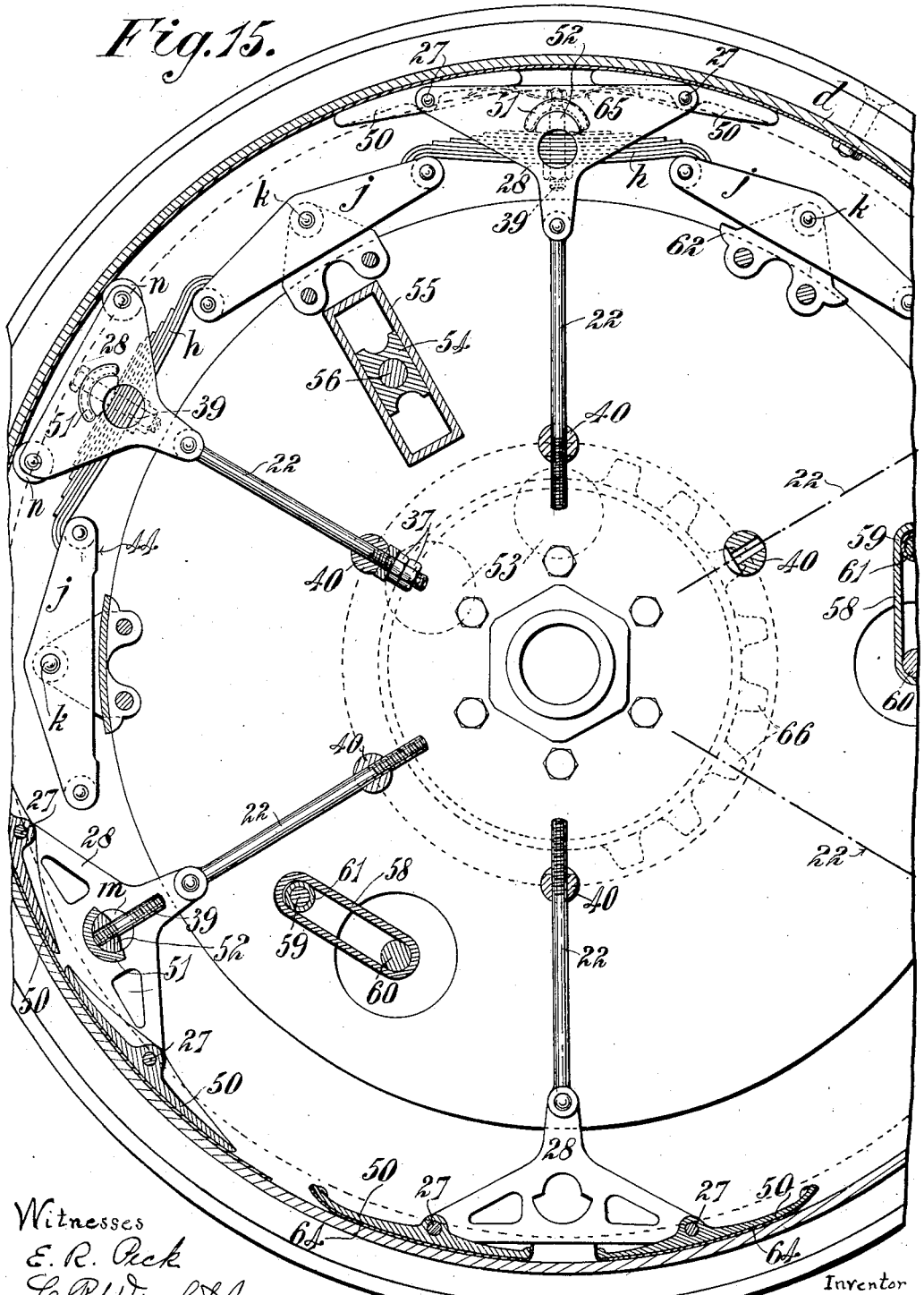
Figure 16:
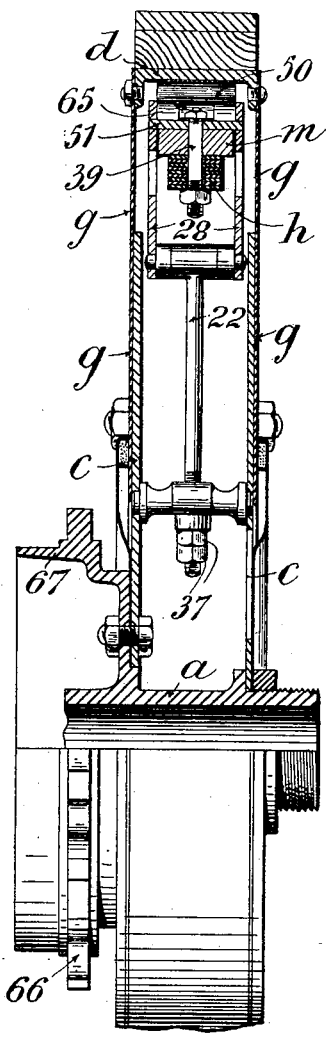

In some cases in place of thrust-rollers $n$ sliding shoes or toboggan-like blocks (hereinafter referred to as "shoes") may be employed. Such an arrangement is simple and durable, and the friction of the shoes on their path is small owing to their large surface and the presence of lubricant in the chamber formed by the hub and rim portions of the wheel. Figs. 15 to 18 illustrate such arrangements; but they are not specifically claimed herein, as it is intended to make them the subject of another application. Referring to Figs. 15 and 16, the shoes 50 are interposed between the lever-spring carriages 28 and the ring $d$, one shoe 50 being pivoted at each end of a carriage 28 on a distance-pin 27. Each carriage comprises two side plates, and to them there is riveted midway between the pins 27 a cross-bar 51 of trough or U shape that receives a block 52 with gudgeons $m$ and to which the lever-spring $h$ is secured by a supplementary bolt 39 passing through the cross-bar and screwed through the gudgeon-block, so as to project beyond the same, its projecting portion extending through the spring $h$ and a nut on its end locking the bolt 39 and fixing the spring-blades in place. The hole through the bar 51 is sufficiently large to allow rocking movement of the bolt end with the springs. The block 52 may be recessed or slotted to receive the spring. It may also be formed with gudgeons or trunnions, which are journaled in the side plates of the carriage. This construction of spring-carriage has the advantage of enabling the spring-blades to be held rigidly to their slotted block at their center, and the large wearing-surface afforded by the trough-like bearing of the block and its trunnions in the carriage sides enables them the better to meet the side and bottom thrusts. Instead of a bolt a stud 39 may be screwed into the block 52, but not through a hole in the bar 51. The abutments 40 are in this case cross-pieces riveted between the disks $c\ c$, in which holes 53 are cut to enable the adjusting-nuts 37 to be manipulated without dismantling the wheel. The driving of the rim portion by the hub portion of the wheel in this case is effected by a die 54, working in a slotted bush 55, riveted between the disks $c\ c$, the die being carried on a shouldered pin 56, secured by nuts between the plates $g\ g$ of the rim portion. Two other pins, 59 and 60, may be used as drivers in conjunction with this arrangement—one for going ahead and one for the reverse direction—each comprising a slotted link 58, which at one end embraces a pin 59, riveted between the disks $c\ c$, and at the other end embraces a pin 60, fixed to the rim portion. The pin 59 may be provided with a ferrule 61, which serves as a distance-piece. The compensating-lever fulcrums $k$ may be riveted between the disk plates $c\ c$ and be formed with lugs 62, with which the levers in case of excessive movement come in contact. As will be understood, rollers $n$ may be used in place of shoes, with the other parts arranged as shown in Figs. 15 and 16. A carriage 28 with rollers $n$ is illustrated at the top left-hand part of Fig. 15. Instead of a spring-path one end of a spring-blade 64 may be riveted to an upwardly-curved end of a shoe, as shown at the bottom of Fig. 15, so that it will be between the shoe and the rim, and its free end will always press against the rim portion of the wheel. In some cases the shoes may be given a tendency to tilt by means of a blade-spring 65, secured at its middle part to the cross-bar 51 or other suitable part of the carriage, its free ends pressing against the adjacent ends of the shoes carried thereby, as shown at the top of Fig. 15. In making the lever-springs $h$ they may have their ends curled after they have been tempered, so that the ends of the springs will be less brittle than would otherwise be the case. The hub $a$ may have a sprocket or other gear wheel 66 and a band brake-wheel 67 formed in one or attached to it.

Figure 17:
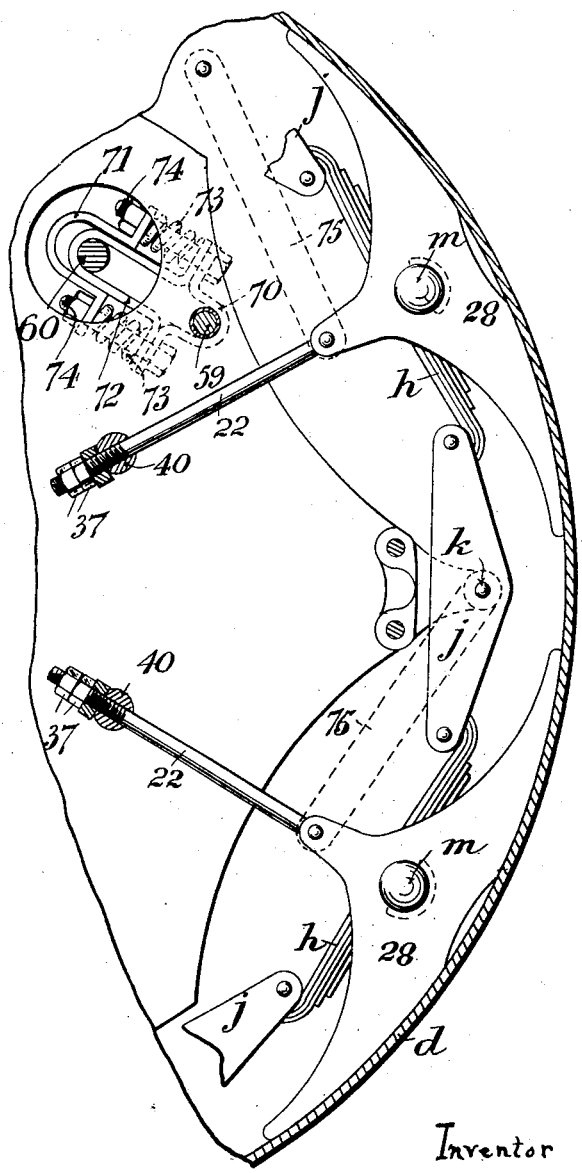

Fig. 17 illustrates a modification wherein each carriage 28 is in the form of a sliding shoe which thrusts against the rim portion of the wheel. Instead of rigid slotted links 58 the means employed for driving the rim from the hub portion may be extensible. Such an arrangement is illustrated in Fig. 17, where each link comprises two U or staple shaped pieces 70 and 71, having flanged edges. These two pieces are arranged mouth to mouth at a distance apart, as shown, and one piece, 70, is connected to the hub portion by the pin 59, which it embraces, and the other piece, 71, has fitted within it an intermediate piece 72, that embraces the pin 60, and it is forced toward the piece 70 by springs 73, interposed between the flanges of the piece 72 and those of the piece 71. Bolts 74 limit the distance apart of the pieces 70 and 71. The piece 72 does not extend to the bottom of the piece 71, so that in transmitting a pull from the hub to the rim portion the piece 72 yields in opposition to the springs 73 until the pull becomes excessive, when the piece 72 abuts against the bottom of the piece 71 or the coils of the springs 73 abut against each other. 75 75 are draglinks by which the spring-carriages 28 may be connected to the fulcrums $k$ to avoid driving the carriages through the springs $h$.

Fig. 18 is a detail view illustrating a modification in which in place of a roller $n$, mounted on the strap of the spring $h$, a segment of a roller is mounted thereon. To prevent this segmental roller tipping over and becoming jammed, a light spring 77, fixed to the strap $l$, acts on pins 78 on the roller and tends to return the said roller to its mid-position. Figs. 19 and 20 illustrate a device for preventing undue shock or strain on the springs $h$ where such is likely to occur. Boxes 80, each containing a spring 81 of sufficient stiffness, and a box-plug 82 are arranged to receive the inward thrust of the retaining bolt or screw 22, so that when its head has moved down in the plug a certain distance any further movement brings it into contact with the bottom of the plug, which then compresses the spring beneath it against the bottom of the box 80. In the case of a wheel having a hub portion built up of wood the box 80 is wedged solidly into position in the middle part of the outer portion of the hub portion and assists to keep in place a leather or other collar 83, against which the screw-head abuts when in its outermost position. The box 80 being let into its place is sealed therein by a wooden cover 84, held therein by screws, which makes the recessed side of the inner wheel flush. Reinforcing-springs, such as those just referred to, may be placed in the outer rings or may be carried on the fulcrum-castings or on the compensating levers, for instance, in the form of laminated blades suitably curved at their ends and for the same purpose as those just described.

As will be seen, the various arrangements described and illustrated permit of the springs, levers, and other parts being contained in a bath of lubricant.

It is to be understood that my improvements may be variously combined and that some may be used without others.

What I claim is—

1. A spring-wheel comprising a hub portion, a rim portion, a series of tangentially-arranged levers and a series of springs connecting said levers and tending to maintain said hub and rim portions concentric, as set forth.

2. A spring-wheel comprising a hub portion, a rim portion, a series of levers and a series of blade-springs connecting said levers and tending to maintain said hub and rim portions concentric, as set forth.

3. A spring-wheel comprising a hub portion, a rim portion, a series of levers and a series of tangentially-arranged blade-springs connecting said levers and tending to maintain said hub and rim portions concentric, as set forth.

4. A spring-wheel comprising a hub portion, a rim portion, and, interposed between said portions, a series of tangentially-arranged levers and a series of springs connecting said levers and tending to maintain said hub and rim portions concentric, as set forth.

5. A spring-wheel comprising a hub portion, a rim portion, and a series of connected tangentially-arranged levers and blade-springs tending to maintain said portions concentric, as set forth.

6. A spring-wheel comprising a hub portion, a rim portion, and a series of connected tangentially-arranged levers and blade-springs tending to maintain said portions concentric, said levers being fulcrumed to the one of said portions and said springs being capable of oscillation about fulcrums that are radially movable in relation to said portion, as set forth.

7. A spring-wheel comprising a hub portion, a rim portion, and a ring-like series of connected tangentially-arranged levers and blade-springs tending to maintain said portions concentric, as set forth.

8. A spring-wheel comprising a hub portion, a rim portion, and a series of connected tangentially-arranged levers and blade-springs tending to maintain said portions concentric, said series of levers and springs being adapted to thrust radially the one against the hub portion and the other against the rim portion, as set forth.

9. A spring-wheel comprising a hub portion, a rim portion, and a series of connected tangentially-arranged levers and blade-springs tending to maintain said portions concentric, said levers being fulcrumed to the one of said portions and said springs being capable of oscillation about fulcrums that are radially movable in relation to said portion, and being provided with devices adapted to transmit radial thrust to the other of said portions, as set forth.

10. A spring-wheel comprising a hub portion, a rim portion, a series of tangentially-arranged levers and a series of springs connecting said levers and tending to maintain said hub and rim portions concentric, and means adapted to cause said portions to rotate together without preventing displacement of their centers, as set forth.

11. A spring-wheel comprising a hub portion, a rim portion, and a series of connected tangentially-arranged levers and blade-springs tending to maintain said portions concentric, said levers being fulcrumed to the one of said portions and said springs being fulcrumed in carriages that are radially movable to a limited extent and are adapted to transmit radial thrust to the other of said portions, as set forth.

12. A spring-wheel comprising a hub portion, a rim portion, and a series of levers connected together by springs to form a complete ring and adapted to mutually assist in tending to maintain said hub and rim portions concentric, as set forth.

13. A spring-wheel comprising a hub portion, a rim portion, and a series of springs mounted to rock on fulcrums and connected together to form a complete ring and adapted to mutually assist in tending to maintain said hub and rim portions concentric, as set forth.

14. A spring-wheel comprising a hub portion, a rim portion, a series of levers fulcrumed to the hub portion and a series of tangentially-arranged blade-springs, whose fulcrums are also in the hub portion but are movable radially in relation thereto, said springs being arranged to thrust outwardly against the rim portion, as set forth.

15. A spring-wheel comprising a hub portion, a rim portion, a series of levers fulcrumed to the hub portion and a series of tangentially-arranged blade-springs, whose fulcrums are also in the hub portion but are movable radially in relation thereto, and means for limiting the outward radial movement of said spring-fulcrums, the outward thrust of said springs being received by said rim portion when said limiting means are not in action, as set forth.

16. A spring-wheel comprising a hub portion, a rim portion, a series of levers fulcrumed to the hub portion and a series of tangentially-arranged blade-springs, whose fulcrums are also in the hub portion but are movable radially in relation thereto, and limiting-bolts extending through abutments, as set forth.

17. A spring-wheel comprising a hub portion, a rim portion, a series of levers fulcrumed to the hub portion and a series of tangentially-arranged blade-springs, whose fulcrums are in carriages attached to limiting-bolts extending through abutments fixed to the hub portion, the outward thrust of said springs being received by the rim portion when said limiting-bolts are not in action, as set forth.

18. A spring-wheel comprising a hub portion, a rim portion, a series of levers fulcrumed to the hub portion and a series of tangentially-arranged blade-springs, whose fulcrums are in carriages attached to limiting-bolts extending through abutments fixed near the center of the hub portion, the outward thrust of said springs being received by the rim portion when said limiting-bolts are not in action, as set forth.

19. A spring-wheel comprising a hub portion, a rim portion, a series of levers fulcrumed to the hub portion, a series of tangentially-arranged blade-springs, radially-movable carriages in which said blade-springs are fulcrumed so as to oscillate independently thereof, limiting-bolts pivotally attached to said carriages, abutments through which said bolts extend, and devices adapted to transmit radial thrust to the rim portion, as set forth.

20. A spring-wheel comprising a hub portion, a rim portion, a series of springs interposed between them, fulcrums on which said springs can rock, and means connecting said springs to one of said portions, said springs being capable of moving away from the other of said portions, as set forth.

21. In a spring-wheel, a hub portion, a rim portion, a closed lubricant-containing chamber between them and springs therein mounted to rock on fulcrums and tending to maintain said portions concentric, as set forth.

22. A spring-wheel comprising a hub portion and a rim portion, inwardly-extending plates on the rim portion adapted to overlap the hub portion and inclose between them an annular chamber adapted to be charged with lubricant and within said chamber a series of tangentially-arranged springs adapted to mutually assist each other in maintaining said hub and rim portions concentric, as set forth.

23. A spring-wheel comprising a hub portion and a rim portion, inwardly-extending plates on the one, adapted to overlap the other and inclose between them an annular chamber adapted to be charged with lubricant, and having within it a series of levers fulcrumed to the hub portion, a series of tangentially-arranged blade-springs, radially-movable carriages in which said blade-springs are fulcrumed so as to oscillate independently thereof, the said carriages being pivotally attached to limiting-bolts that extend through abutments carried by the hub portions, as set forth.

24. In a spring-wheel, the combination of a hub portion, a rim portion, a series of tangentially-arranged levers, a series of coöperating springs mounted to rock on fulcrums and tending to maintain said portions concentric, and a driving connection between said hub and rim portions consisting of a pin fixed to one of said portions and extending through a slotted port on the other of said portions, as set forth.

25. In a spring-wheel, the combination of a hub portion, a rim portion, a series of tangentially-arranged levers, a series of coöperating springs mounted to rock on fulcrums and tending to maintain said portions concentric, and a driving connection between said hub and rim portions consisting of parallel pins fixed one to each of said portions and a slotted link embracing said pins, as set forth.

26. In a spring-wheel the combination of a hub portion, a rim portion, a series of tangentially-arranged levers, a series of coöperating springs mounted to rock on fulcrums and tending to maintain said portions concentric, and a driving connection between said hub and rim portions consisting of parallel pins fixed one to each of said portions and an extensible slotted link embracing said pins, as set forth.

27. In a spring-wheel, the combination of a hub portion, a rim portion, a series of tangentially-arranged levers, a series of coöperating springs mounted to rock on fulcrums and tending to maintain said portions concentric and a driving connection between said hub and rim portions consisting of parallel pins fixed one to each of said portions and a slotted link embracing said pins, said link being capable of extension in opposition to springs when said pins move apart, as set forth.

28. In a spring-wheel comprising a hub portion, a rim portion and springs tending to maintain said portions concentric, a driving connection between said hub and rim portions consisting of parallel pins fixed one to each of said portions and a slotted link embracing said pins, said link comprising flanged U-shaped pieces 70, 71 and 72, springs 73 and bolts 74, the piece 72 being capable of movement between the pieces 70 and 71, as and for the purposes specified.

29. A spring-wheel comprising a hub portion, a rim portion, a series of spring-levers tending to maintain said portions concentric, said springs being carried by one of said portions and capable of radial movement, means for limiting said radial movement, devices attached to said springs and adapted to transmit thrust to the other of said portions, and means for preventing the parts rattling, as set forth.

30. A spring-wheel comprising a hub portion, a rim portion, a series of spring-levers tending to maintain said portions concentric, said springs being carried by one of said portions and capable of radial movement, means for limiting said radial movement, devices attached to said springs and adapted to transmit thrust to the other of said portions and a spring-path secured to the thrust-receiving part and adapted at all times to press against said thrust-transmitting devices and thus prevent rattling, as set forth.

31. A spring-wheel comprising a hub portion, and a rim portion, inwardly-extending plates on the one adapted to overlap the other and inclose between them an annular chamber adapted to be charged with lubricant, and having within it a series of levers fulcrumed to the hub portion, a series of tangentially-arranged blade-springs radially-movable carriages in which said blade-springs are fulcrumed so as to oscillate independently thereof, the said carriages being pivotally connected to limiting-bolts that extend through abutments near the center of the hub portion and provided with adjusting-nuts, as set forth.

32. In a spring-wheel, the combination of a hub portion, a rim portion, laminated lever-springs tending to maintain them concentric, and compensating levers connecting the several springs together, as set forth.

33. In a spring-wheel, the combination of a hub portion, a rim portion, compensating levers, cross-pins on said levers laminated lever-springs tending to maintain concentric the said portions and having curled ends adapted to bear upon the cross-pins of the levers, as set forth.

34. In a spring-wheel, the combination of a hub portion, a rim portion, laminated lever-springs tending to maintain them concentric, and compensating levers connecting the several springs together, said lever-springs carrying thrust-transmitting rollers, as set forth.

35. In a spring-wheel, the combination of a hub portion, a rim portion, laminated lever-springs tending to maintain them concentric, and compensating levers connecting the several springs together, said lever-springs being fitted with carriages having antifrictional thrust-transmitting devices, as set forth.

Signed at 75 to 77 Cornhill, London, England, this 27th day of January, 1903.

ARTHUR SAMUEL FRANCIS ROBINSON.

Witnesses:
PERCY E. MATTOCKS,
WM. O. BROWN.